Dec. 1, 1953  W. E. HUBER  2,661,045
METHOD OF MAKING V TYPE CONNECTOR BELTS
Filed May 25, 1949
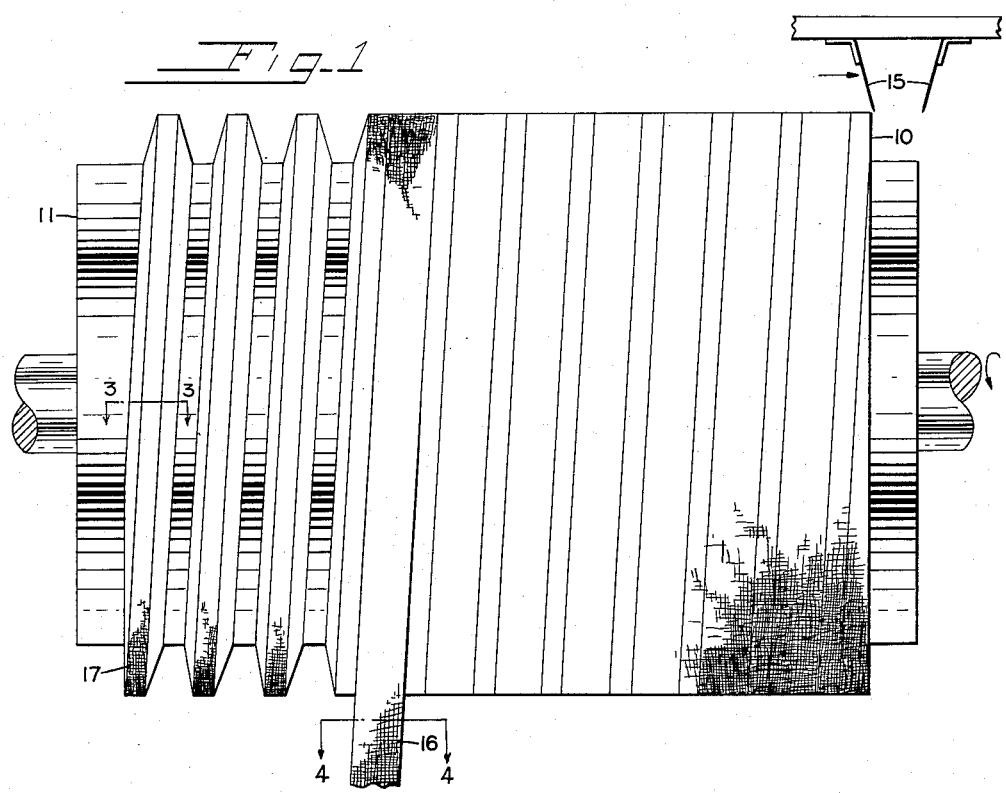
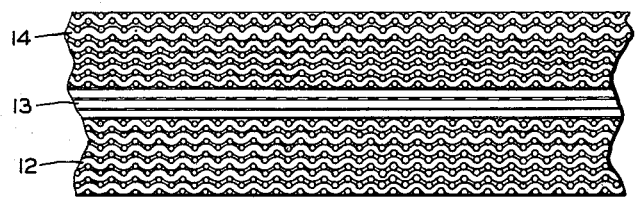
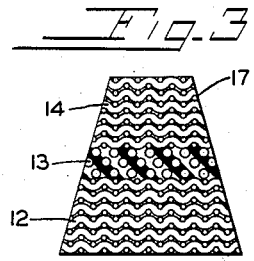
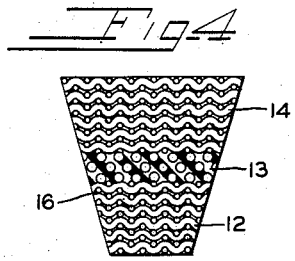
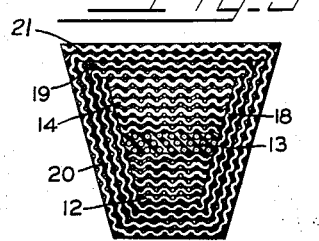
INVENTOR.
WALTER E. HUBER
BY
HIS ATTORNEY Patented Dec. 1, 1953

2,661,045

UNITED STATES PATENT OFFICE 2,661,045

METHOD OF MAKING V-TYPE CONNECTOR BELTS

Walter E. Huber, Dayton, Ohio, assignor to The Dayton Rubber Company, a corporation of Ohio Application May 25, 1949, Serial No. 95,179

3 Claims. (Cl. 154—4)

The present invention relates to belts and to a method for their manufacture. More particularly, it relates to an improved method of making belts which are adapted to be cut to the desired length after which the ends suitably fastened together will provide an endless belt.

This invention is particularly directed to the manufacture of V-type belts having a trapezoidal cross section, which are formed by building up a belt body on a cylindrical mandrel in a plurality of layers of the desired material after which the belt body is cut to form a single long length belt of the desired cross sectional shape. This can be further cut into suitable lengths and the ends joined together by means of a connector to form an endless belt. Such belts are particularly useful in driving generators, blowers or other equipment on railroad cars, or in other installations where connector type belts are particularly desired.

One method of making belts of this type is described in the patent to Ritzert 2,354,062 granted July 18, 1944. In accordance with the method described in the aforesaid patent, long length belts are made by cutting a belt body on a mandrel by means of a pair of spaced inclined knives which are guided across the mandrel in a helical path. In the operation of this process a certain amount of waste occurs through the formation of V-shaped "ring scrap" which is the waste material left between cuts due to the inclination of the knives.

In accordance with the present invention the applicant has found that connector type belts can be made with the elimination of any ring scrap and it has also been found that belts produced in accordance with the present method will have a greatly increased life and reduced amount of stretch.

It is therefore an object of the present invention to provide a method for the manufacture of V-type belts of the connector type in which ring scrap and waste are eliminated. It is a further object of the present invention to provide a method for the manufacture of connector type belts in which the belts so produced will have an increased life and connector strength and a reduced amount of stretch. It is an additional object of the present invention to produce belts having a novel construction.

The invention may be best described with reference to the accompanying drawing in which:

Fig. 1 diagrammatically illustrates a method and apparatus for helically cutting a built-up belt body on a mandrel.

Fig. 2 illustrates a longitudinal vertical cross section through the belt body as it is formed on the mandrel.

Fig. 3 is a vertical transverse cross section through a belt core of one ring of belting which is formed in the cutting operation, taken along lines 3—3 of Figure 1.

Fig. 4 is a vertical transverse cross section through the core of another ring of belting which is formed in the cutting operation, taken along lines 4—4 of Figure 1.

Fig. 5 illustrates a transverse vertical cross section of a finished belt showing the cores of Figs. 3 and 4 with a wrapper applied thereto.

Referring to the drawings in detail, Fig. 1 shows belt body 10 which is built up on cylindrical mandrel 11. This belt body is formed by applying a plurality of layers of rubberized fabric and cord in the manner described below. The winding operation is most easily carried out by rotating the drum upon its axis and winding the necessary number of layers of fabric or the like around the drum under a certain amount of tension. A plurality of layers 12 of rubberized fabric is first applied. This fabric is preferably a straight-laid square-woven cotton duck which has been preshrunk and treated with crude rubber latex followed by the application of a skim coating of either natural or synthetic rubber. The drum or mandrel itself has preferably been prepared by coating with a layer of cured plastic rubber to protect the metal surface of the drum and facilitate cutting. Any desired number of plies of the base fabric may be applied depending upon the ultimate size and thickness of the belt. Generally, this would be from four to twelve plies. After the application of the fabric plies in the manner indicated, one or more plies of cord 13 are applied which is to serve as the neutral axis. This cord is preferably of rayon or nylon and is applied by winding on the desired number of layers. This cord has been treated with latex and skimmed with a rubber composition. After the application of the neutral axis layers of cord, a number of fabric layers 14 are then applied. These layers will be identical in type and number to layers 12 so that the net result is that layers 12 and 14 are identical in construction and composition with neutral axis layer 13 being equidistantly spaced between the two.

The belt is then cut in such a manner that two identical lengths of belt material are formed, one being inverted and the other being in an upright position. This is achieved by mounting knives 15 in an inclined position and spaced a distance equal to the desired top width of the belt. The angles of inclination of the knives correspond to the slope of the side walls of the belt to be produced and the resulting cuts will, of course, be formed at these angles. These knives are then guided in a helical cut across the surface of the belt body with the pitch of the helix being equal to the sum of the top width plus the bottom width of the belt. The knives are moved horizontally across the face of the drum by means of a screw drive and at the same time the drum is rotated. Preferably the depth of each individual cut is only a fraction of the total thickness of the belt sleeve and the total cut is accomplished by repeated movements of the knife across the drum with adjustment of the knives for the depth desired prior to each movement. After the cutting operation has been completed the upright core shown at 16 is stripped from the drum leaving the inverted core 17 in place, by unreeling it from the drum. The core is then laid with the bottom side up on a cementing table. The operation is then repeated for the inverted core which is laid on the cementing table with its narrow side up. The cores are then coated with rubber cement preparatory to application of the fabric coverings.

Each core is then covered to give a product as shown in cross section in Fig. 5. In the covering operation a U-shaped cover 18 of bias fabric is first applied to the bottom and sides of the core. A second cover of rubberized bias fabric is then applied around the four sides of the belt with a full lap on top as shown at 19. An additional U-shaped cover may then be applied over the sides and bottom of the belt of the same material and then a fourth covering of rubberized bias fabric is applied around the four sides of the belt with a full lap at the top as shown at 21. This provides a cover of four layers of bias fabric on all four sides of the belt. The covered belt is then cured in a mold having a trapezoidal cross section and after curing any overflow is trimmed off and the belt may then be cut into the desired lengths.

A typical belt construction of the type described herein is composed of the following materials:

Compression and tension sections — 17-oz. cotton duck, latex impregnated and skim coated with under rubber composition, six layers each section.

Cord neutral axis—continuous filament high tenacity plied rubberized rayon cord.

The knives for this construction are set to cut at a 34° included angle, the depth of each cut being 1/32 in. and is repeated until the sleeve is cut through.

The cover layers are bias fabric preferably cut at a 45° angle, composed of an 8-oz. plied duck latex impregnated and skim coated with a crude rubber composition.

The rubber compositions utilized in making the belt or in impregnating the fabrics used may be of either natural rubber or synthetic rubber-like materials, such as the butadiene-styrene copolymer type (GR-S), the butadiene-acrylonitrile type (GR-A), the chloroprene polymer type (neoprene), etc. Such compounds and their use are well known in the art. Vulcanizing agents, accelerators and other compounding agents are incorporated in the conventional manner.

I claim:

1. A method of making connector type belts having trapezoidal cross sections which comprises superimposing upon a cylindrical mandrel a plurality of layers of rubberized fabric to form a first section, superimposing upon said fabric layers a neutral axis section comprising one or more layers of rubberized cord, superimposing upon said neutral axis section a plurality of layers of rubberized fabric of the same number and type as in the first section and thereby forming a cylindrical belt body consisting of inner and outer rubberized fabric sections between which is equidistantly positioned a neutral axis section comprising one or more layers of cord, severing said belt body to form two belt core members by forming a pair of cuts through said body at a converging angle to the mandrel along a helical path longitudinally of the belt body and axially of the mandrel, the pitch of said helix being equal to the sum of the top and bottom widths of each belt core formed thereby and the angle of said cuts conforming to the desired slope of the sides of the belt core, and thereby forming two elongated belt cores having the same trapezoidal cross section and the same structure and composition.

2. A method according to claim 1 wherein each belt core is covered with a first layer of rubberized bias fabric along the bottom and sides thereof and with a second layer of rubberized bias fabric along the bottom, sides, and top thereof with a full lap at the top.

3. A method of making connector type belts having trapezoidal cross sections which comprises superimposing upon a cylindrical mandrel a plurality of layers of rubberized fabric to form a first section, superimposing upon said fabric layers a neutral axis section of longitudinally inextensible material, superimposing upon said neutral axis section a plurality of layers of rubberized fabric of the same number and type as in the first section and thereby forming a cylindrical belt body consisting of inner and outer rubberized fabric sections between which is equidistantly positioned the neutral axis section, severing said belt body to form two belt core members by forming a pair of cuts through said body at a converging angle to the mandrel along a helical path longitudinally of the belt body and axially of the mandrel, the pitch of said helix being equal to the sum of top and bottom widths of the belt core formed thereby and the angle of said cuts conforming to the desired slope of the sides of the belt core, and thereby forming two elongated belt cores having the same trapezoidal cross section and the same structure and composition.

WALTER E. HUBER.

References Cited in the file of this patent
UNITED STATES PATENTS

| Number | Name | Date |
| --- | --- | --- |
| 2,268,865 | Freedlander | Jan. 6, 1942 |
| 2,275,233 | Ritzert | Mar. 3, 1942 |
| 2,281,148 | Freedlander | Apr. 28, 1942 |
| 2,337,985 | Freedlander | Dec. 28, 1943 |
| 2,354,062 | Ritzert | July 18, 1944 |
| 2,392,373 | Freedlander | Jan. 8, 1946 |
| 2,430,328 | Daniels | Nov. 4, 1947 |